Sept. 5, 1950 F. B. WILLIAMS ET AL 2,520,985

ANTENNA COUPLING CIRCUIT

Filed Oct. 22, 1947 2 Sheets-Sheet 1

Inventors
Fred B. Williams
Fred P. Hill
William Blinoff

By

Foorman L. Mueller

Atty

Sept. 5, 1950 F. B. WILLIAMS ET AL 2,520,985

ANTENNA COUPLING CIRCUIT

Filed Oct. 22, 1947 2 Sheets-Sheet 2

INVENTORS
Fred B. Williams
Fred P. Hill
William Blinoff
BY
Foorman L. Mueller
, Atty Patented Sept. 5, 1950 2,520,985

UNITED STATES PATENT OFFICE 2,520,985

ANTENNA COUPLING CIRCUIT

Fred B. Williams, Lincolnwood, Fred P. Hill, Franklin Park, and William Blinoff, Chicago, Ill., assignors to Motorola, Inc., Chicago, Ill., a corporation of Illinois Application October 22, 1947, Serial No. 781,282

9 Claims. (Cl. 250—33.67)

This invention relates generally to antenna coupling systems for radio receivers and more particularly to an efficient system for coupling a pair of loop antennas angularly positioned with respect to each other to a receiver to provide a non-directional response pattern.

In the prior art, a pair of loop antennas have been positioned at an angle with respect to each other to provide a non-directional response pattern. Various circuits have been devised to combine the signals from the loops to provide the desired response characteristics. In such circuits it is necessary to shift the phase of the signal from one of the loops to provide an input to the receiver which is non-directional. The known circuits for coupling loop antennas to permeability tuned receivers have not been satisfactory. This is because in order to tune the secondary circuit through a band of frequencies, the inductance of the primary is also varied through a wide range resulting in appreciable mismatch through a large portion of the frequency band. For such a circuit to work satisfactorily, the inductance of the primary winding must be substantially constant throughout the band of frequencies.

It is, therefore, an object of the present invention to provide an improved input circuit for connecting a pair of loop antennas to a radio receiver.

It is another object of this invention to provide an improved permeability tuned circuit for connecting a pair of loop antennas to a radio receiver to provide a non-directional response characteristic.

A still further object of this invention is to provide a system for applying the signal picked up in a conducting body by the effective loop circuits formed therein to a radio receiver which is effective to apply the signals to the receiver in the proper angular relationship and without substantial attenuation thereof.

A feature of this invention is the provision of an input system for a radio receiver including a pair of permeability tuned resonant circuits adapted to be individually connected to a pair of loop antennas which are angularly positioned with respect to each other with the circuits being coupled by a capacitor common to both resonant circuits to provide a non-directional input to the receiver.

A further feature of this invention is the provision of a system for coupling a pair of loop antennas to a radio receiver in which each antenna is connected to a coupling unit having a primary winding of substantially constant inductance and a secondary winding having a variable inductance so that the secondary circuit can be tuned to be resonant at various frequencies.

Further objects, features and advantages will be apparent from a consideration of the following description taken in connection with the accompanying drawings in which.

In practicing the invention there is provided a circuit for applying signals picked up by a pair of loop antennas angularly disposed with respect to each other to a permeability tuned receiver. The system is applicable for use with independent loop antennas or for use in applications where the signal is picked up by a conducting body such as the metal body of the vehicle. The system includes a pair of permeability tuned circuits for connection to the respective loops with the two circuits being capacity coupled to provide a 90 degree phase shift of the signal from one of the loops to provide an over-all response characteristic which is substantially non-directional. A permeability tuned coupling unit is provided including an iron sleeve positioned between the primary and secondary windings so that the inductance of the primary winding is substantially constant throughout the tuning range. A movable iron core is provided for varying the inductance of the secondary winding for tuning the circuit through the desired frequency range.

Figure 1:
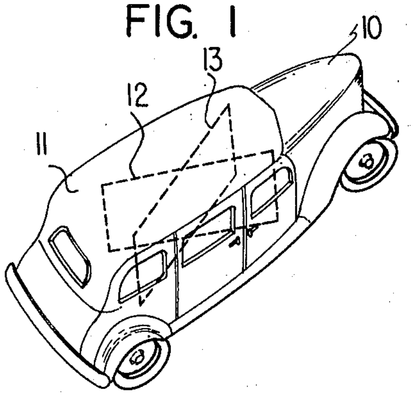
Fig. 1 is a perspective view of an automobile illustrating the loop antennas formed in the body thereof.
Figure 2:
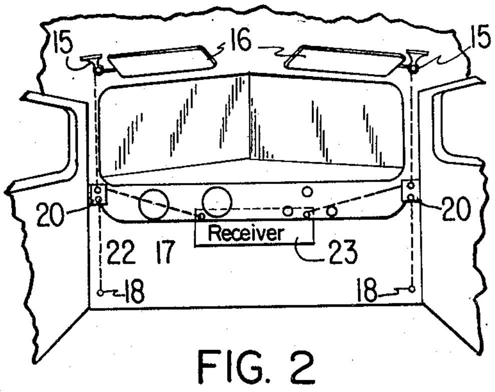
Fig. 2 illustrates the manner in which signals may be picked up from a vehicle body.
Figure 3:
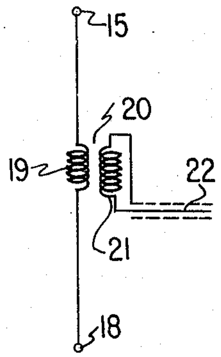
Fig. 3 illustrates the manner in which connection may be made to the vehicle body.

Referring now to the drawings, in Fig. 1 there is illustrated an automobile 10 having a metal conducting body 11. Although obviously a great number of closed loops are formed in the metal body, it has been found that two effective loop circuits are formed as are indicated by the dotted lines 12 and 13 which are substantially displaced from each other and which are of substantially maximum size. It has been found that satisfactory results may be obtained when using loops displaced at angles from 40 degrees to 90 degrees. Utilization of the signals picked up in these loops as the input signals for a radio receiver is disclosed and claimed in our copending application, Serial No. 724,436, filed January 25, 1947. Fig. 2 illustrates the positions on the vehicle body to which connection may be made to utilize the signal picked up by the body in a radio receiving circuit. In this figure connection is made to the mounting supports 15 of the visors 16 and to the body at the points 18 under the ends of the dash 17. Thus the two circuits 12 and 13 are tapped so that the signal picked up therein can be applied to a radio receiver. Fig. 3 shows the manner of making connection between the pickup points 15 and 18 and a receiver, with the leads from the pickup points being connected to the primary 19 of a transformer 20. Transformer 20 includes a secondary winding 21 connected to a coaxial cable 22 the outer conductor of which is grounded. By providing the matching transformer 20 and the coaxial lead-in 22 the signal picked up from the body can be applied to a receiver substantially unattenuated.

Figure 4:
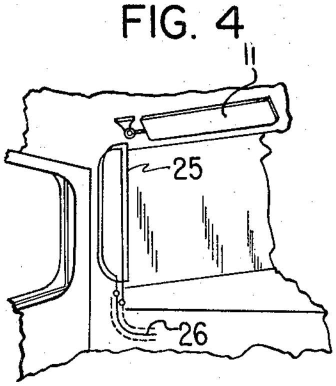
Fig. 4 illustrates an alternate method of picking up signals from a vehicle body.

Fig. 4 illustrates an alternative method of picking up signals from the body of a vehicle. Instead of making connection directly to the vehicle body 11, the signal in the vehicle body is picked up inductively by a coil 25 which is positioned in the plane of the effective loop circuits formed in the body and is positioned as close as possible to one side of the loop circuit to provide maximum coupling. It is obvious that a pair of pickup coils 25 are required with each of the coils being connected to the receiver by coaxial lead-in 26. Inductive pickup coils are described more in detail and claimed in the application of Fred B. Williams and Fred P. Hill, subject: Vehicular Antenna System, Serial No. 781,281 of even date herewith.

Figure 5:
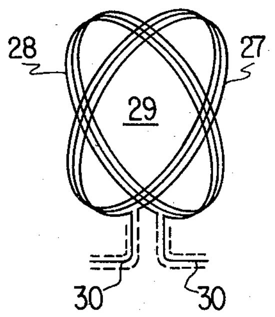
Fig. 5 illustrates separate loop antennas which may be used as the signal pickup means for the antenna input system.

The antenna coupling circuits in accordance with the invention are not limited to use with loop circuits formed in a conducting body such as an automobile body, but are also suitable for use with individual loops positioned at right angles with each other as illustrated in Fig. 5. In this figure two loops are formed by winding coils 27 and 28 on a spherical member 29. The coils 27 and 28 are positioned at right angles to each other so that by use of a proper coupling circuit an input signal may be obtained therefrom and applied to a receiver having a substantially non-directional response. Each of the coils are connected to a coaxial lead-in 30 which is adapted to apply the signal picked up thereby to a radio receiver.

Figure 6:
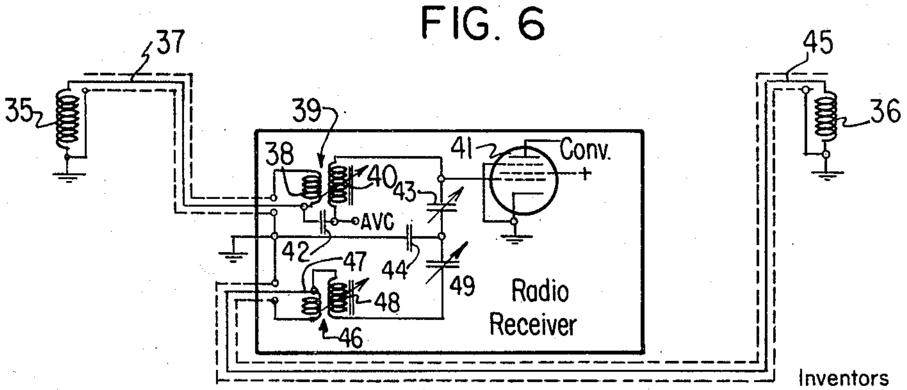
Fig. 6 illustrates one embodiment of the input system in accordance with the invention.

Fig. 6 illustrates an improved antenna input system in accordance with the invention. The coils 35 and 36 of Fig. 6 may be the secondary coils 21 of the transformer 20 as illustrated in Figs. 2 and 3, the inductive pickup coils 25 of Fig. 4, or the independent pickup coils 27 or 28 of Fig. 5. That is, the input system of Fig. 6 is adaptable for use with the various antenna systems disclosed or in any other antenna system having two loop antennas positioned at a substantial angle with respect to each other. The signal from the coil 35 is applied through coaxial lead-in 37 to the primary winding 38 of a coupling unit 39. It is noted that the outer conductor or shield of the coaxial cable is grounded at both ends and the signal is applied to the cable between the center conductor and the outer conductor thereof in the usual manner. The coupling unit 39 includes a secondary winding 40 which is inductively coupled to the primary winding 38. The secondary winding is also directly connected in series with the primary winding. Energy is, therefore, supplied to the secondary winding by these two means with the result that the gain of the system is substantially uniform throughout the frequency range. The secondary winding 40 is connected to tube 41 which may be a radio frequency amplifier stage having the output thereof applied to a converter as indicated in the drawings, or it may be a converter tube to which the signal is applied directly by the antenna system. The secondary coil 40 is connected in series with trimmer condenser 43, coupling condenser 44, primary winding 38, and D. C. isolating condenser 42 to form a resonant circuit. The trimmer condenser 43 is variable through a small range to allow alignment of the various circuits of the radio receiver in a well known manner. For tuning the input circuit, a variable core is provided in the coupling unit 39 to change the inductance of the winding 40. The pickup coil 36 is similarly connected through a coaxial cable 45 to a coupling unit 46 which may be identical to the coupling unit 39. Coupling unit 46 has a primary winding 47 connected to the coil 36 and secondary winding 48 which are connected in a resonant series circuit including trimmer condenser 49 and coupling condenser 44. The condenser 44 serves to couple the input from the pickup coil 36 to the circuit for the pickup coil 35 so that the currents therein are combined to provide a non-directional response characteristic. More particularly, the condenser 44 serves to shift the phase of the signals from the pickup coil 36 through 90 degrees. The coupling unit 46 also includes a movable iron core for varying the inductance of coil 48 which may be ganged with the core of coupling unit 39 and with permeability coupling units provided elsewhere in the radio receiver.

Figure 7:
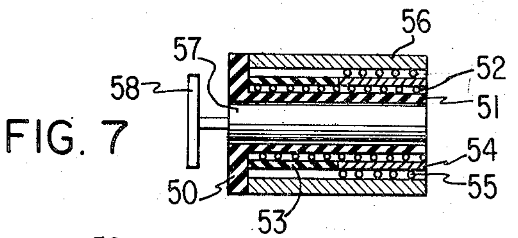
Fig. 7 is a cross-sectional view of the coupling unit in accordance with the invention.
Figure 8:
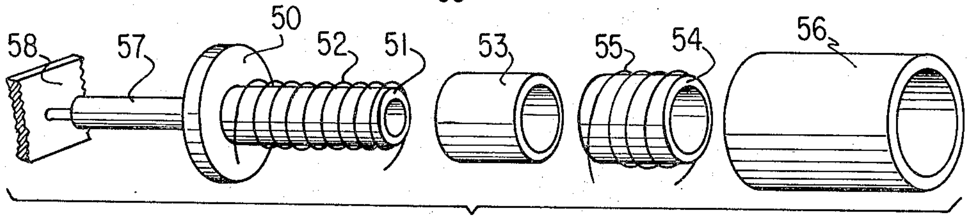
Fig. 8 is an exploded perspective view of the coupling unit.

The physical structure of the coupling units 39 and 46 are shown in Figs. 7 and 8 with Fig. 7 showing a cross-sectional view and Fig. 8 an exploded view of the unit. It is seen that the coupling unit includes an insulating coil form 50 having a tubular portion 51 on which the secondary winding 52 is wound. The winding 52 is covered by two annular portions of substantially equal length, the first being made of insulating material and is designated as 53. The other portion comprises an annular magnetic ring 54 on which the primary winding 55 is positioned. It is to be pointed out that the annular magnetic ring 54 need not be half the length of the coil form 50 but may be greater or less than this amount. The magnetic ring must be coextensive with the primary winding to be effective to hold the inductance thereof substantially constant. The insulating ring 53 and the magnetic ring 54 on which the primary winding is mounted are arranged in abutting relationship. Outside the insulating ring 53 and the primary winding 55 there is placed a magnetic tubular member 56 which is coextensive with the tubular portion 51 of the coil form. For varying the inductance of the secondary winding 52, a movable iron core 57 is provided within the tubular coil form 51 which is movable with respect to the winding 52 to vary the inductance thereof.

The movable core 57 may be connected to any moving mechanism such as a carriage 58 to control the position of the core in the coil and thereby control the frequency to which the coupling unit is tuned.

The construction of the coupling unit is such that the field of the primary winding 55 extends through the magnetic ring 54 which provides a low reluctance magnetic path therefor. Therefore, the movement of the core 57 with respect to the coils will have a substantial effect on the secondary winding 52 and will have substantially no effect on the primary winding 55. In systems constructed and found satisfactory under tests, the primary winding was made to have an inductance substantially half that of the coil to which it is coupled. For example, satisfactory results were obtained when using coils as at 35 and 36 in Fig. 6 having an inductance of approximately 50 microhenries coupled to a primary coil having an inductance of approximately 25 microhenries. The coupling units may be of small construction, units having been built which could be placed in a standard shield can ¾ inch in diameter and 1½ inches long. Although the coupling units have been described as applicable for use in systems where a pair of angularly positioned loop antennas are connected to a receiver, it is apparent that these units are also suitable for coupling a single loop antenna to a receiver.

Figure 9:
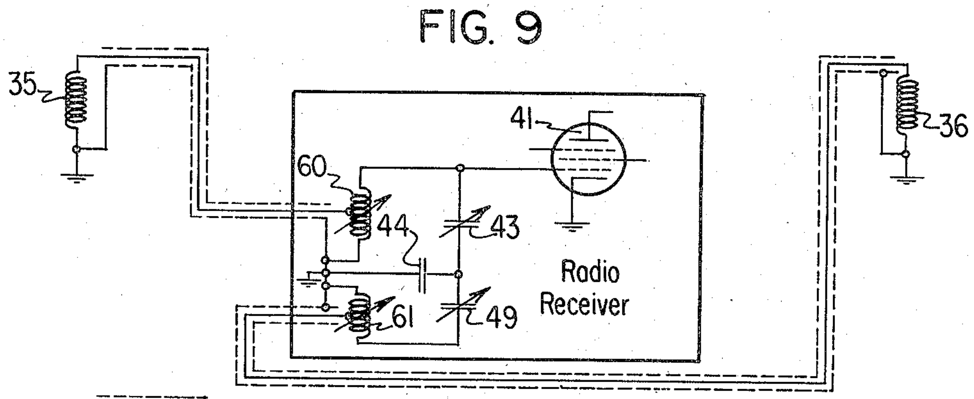
Figs. 9 and 10 illustrate modified input circuits.

In Fig. 9 there is illustrated a modified circuit for coupling pickup coils to a receiver. The circuit generally is similar except that the coupling units 39 and 46 are replaced by tapped coils 60 and 61. The inductance of the tapped coils are varied by movable cores so that the circuits for the loops 35 and 36 can be tuned to the desired frequency. Trimmer condensers 43 and 49 are provided as in Fig. 6 to permit alignment of the circuits and a coupling condenser 44 is provided for applying the signal from the loop 36 to the input circuit of the loop 35 in the proper phase relationship. In the circuit illustrated in Fig. 10 the coupling units are replaced by series coils 62 and 63 in the lead-ins from the pickup coils 35 and 36, respectively. The two circuits are capacity coupled as in the previous circuits and are tuned by movable iron cores in the coils 62 and 63.

Figure 10:
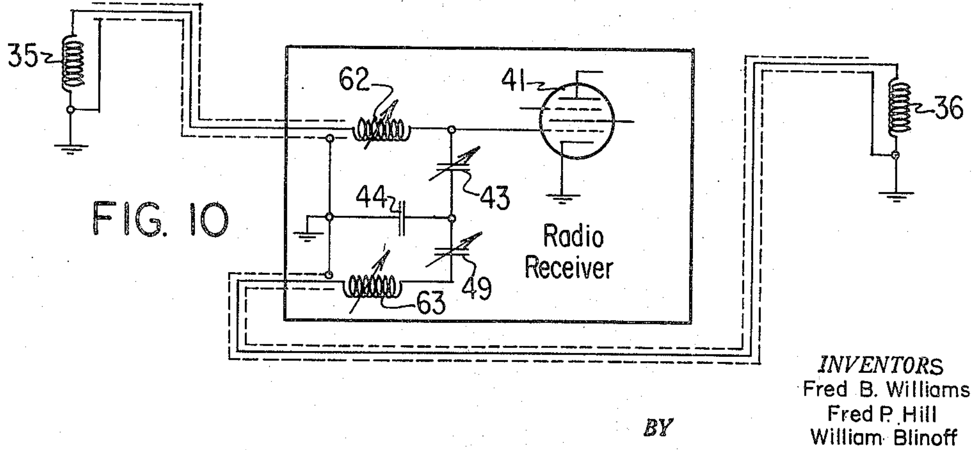

In the coupling systems of Figs. 6, 9 and 10, as the circuits are tuned by variable inductance, the capacitance in the circuit is not varied throughout the tuning range. The use of the coupling condenser, therefore, gives substantially constant coupling across the frequency band as the capacitance of the circuits remain substantially constant across the band. The circuits provide efficient coupling of a pair of loop antennas and as they are permeability tuned they are readily usable with receivers having permeability tuned radio frequency and oscillator stages to thereby gain the advantages of permeability tuning in these stages. In receivers tested which use the input system in accordance with the invention, great increases in signal strength have been realized over the use of prior systems. In automobile installations in which the car body is used as an antenna, the results have been superior, in many respects, to those obtained when using a rod type antenna which projects from the vehicle.

Although the antenna input system has been particularly described in connection with use thereof with vehicular receivers, it is obvious that the system is applicable to use with other receivers where a conducting body is available or where separate loop antennas are used. The improved coupling unit is also applicable for use with a single loop antenna and results in decided improvement over the conventional circuits used to couple a single loop antenna to a permeability tuned receiver.

While we have described certain embodiments of our invention which are illustrative thereof, it is apparent that various changes and modifications can be made therein without departing from the intended scope of the invention as defined in the appended claims.

We claim:

1. A coupling unit comprising, an elongated tubular coil form, a first winding supported on said coil form and extending along the length thereof, an annular magnetic member positioned over said winding and extending along only a portion of the length thereof, a second winding supported about said annular magnetic member, a tubular magnetic member positioned about said coil form, said member and said windings, and a magnetic core movable within said coil form to vary the inductance of said first winding, said annular magnetic member forming a magnetic shield between said windings so that said core has substantially no effect on the inductance of said second winding.

2. A coupling unit for connecting an antenna to a wave signal translating device comprising, an insulating form including a base and an elongated tubular portion, a first winding supported on said tubular portion and extending along the length thereof, an annular magnetic member positioned over said winding and extending only a portion of the length thereof, a second winding positioned on said annular magnetic member, a tubular magnetic member positioned over said second winding and being coextensive with said tubular portion, and a core made of magnetic material movable within said coil form to vary the inductance of said first winding, said annular magnetic member forming a magnetic shield between said windings so that said core has substantially no effect on the inductance of said second winding.

3. In a wave signal translating device, an input system for coupling a pair of directional antennas which are angularly positioned with respect to each other to said device including in combination, a pair of closed series circuits individually inductively coupled to said antennas, each of said circuits including variable inductance means for tuning the same so that said series circuit is resonant at any frequency throughout a range of frequencies, and a coupling condenser common to said series circuits for applying the signal from one of said circuits to the other of said circuits in proper phase relationship to provide a combined signal which is substantially non-directional.

4. An input system for coupling a pair of angularly positioned effective loop circuits formed in a conducting body to a wave signal translating device including in combination, a pair of closed series circuits, means individually inductively coupling said series circuits to said loop circuits, each of said series circuits including variable inductance means for tuning the same to any frequency throughout a range of frequencies, and a coupling condenser common to said series circuits for applying the signal from one of said circuits to the other of said circuits in proper phase relationship to provide a combined signal which is substantially non-directional.

5. An input system for coupling a pair of directional antennas which are angularly positioned with respect to each other to a wave signal translating device including in combination, a pair of coupling units each including a primary winding of fixed inductance and a secondary winding of variable inductance inductively coupled to said primary winding, means individually connecting said primary windings to said antennas, a pair of resonant circuits each including said primary and secondary windings of one of said coupling units connected in series and tuned by said secondary winding, and a condenser common to said resonant circuits for coupling the same to provide an input signal to said device which is substantially non-directional.

6. An input system for coupling a pair of angularly positioned effective loop circuits formed in a conducting body to a wave signal translating device including in combination, a pair of coupling units having primary and secondary windings in inductive relation, means individually coupling said primary windings to said effective loop circuits, said coupling units including magnetic cores movable relative to said secondary windings and magnetic shielding means positioned between said primary and secondary windings thereof, a pair of resonant circuits individually including said primary windings and said secondary windings connected in series, with said resonant circuits being tunable through a range of frequencies by movement of said magnetic cores, and a condenser common to said resonant circuits for applying the signal from one of said circuits to the other of said circuits in proper phase relationship to provide a combined signal which is substantially non-directional.

7. An input system for coupling a pair of directional antennas which are angularly positioned with respect to each other to a wave signal translating device including in combination, a pair of coupling units having primary and secondary windings in inductive relation with said primary windings being individually connected to said loop antennas, said coupling units including magnetic cores movable relative to said secondary windings for varying the inductance thereof and magnetic shielding means positioned between said primary and secondary windings thereof, a pair of resonant circuits each of which includes one of said primary windings and the associated secondary winding connected in series, with said resonant circuits being tunable through a range of frequencies by movement of said cores of said secondary windings, and a condenser common to said resonant circuits for applying the signal from one of said circuits to the other of said circuits in proper phase relationship so that the combined signal has a non-directional response characteristic.

8. A coupling unit for connecting an antenna to a wave signal translating device including in combination, a primary winding adapted to be connected to said antenna, a secondary winding, a resonant circuit including said primary and secondary windings, a ferromagnetic core movable with respect to said secondary winding for varying the inductance thereof and thereby changing the resonant frequency of said circuit, and ferromagnetic sleeve means positioned between said primary and secondary windings providing an effective shield therebetween so that said windings may be closely positioned to provide a compact unit, said ferromagnetic sleeve means providing a path for the field of said primary winding so that said ferromagnetic core has substantially no effect on the inductance of said primary winding.

9. An antenna coupling device including in combination, closely positioned primary and secondary windings, a magnetic core movable relative to said secondary winding for varying the inductance thereof, and a magnetic shielding member positioned adjacent said primary winding providing a low reluctance magnetic path for the field of said primary winding and providing an effective shield between said primary and secondary windings so that the position of said core has substantially no effect on the inductance of said primary winding, said magnetic shielding member having a permeability substantially greater than air so that the coupling device forms a compact unit.

FRED B. WILLIAMS.
FRED P. HILL.
WILLIAM BLINOFF.

REFERENCES CITED

The following references are of record in the file of this patent:

UNITED STATES PATENTS

| Number | Name | Date |
|---|---|---|
| 1,626,464 | Heina | Apr. 26, 1927 |
| 1,711,745 | Pearne | May 7, 1929 |
| 2,255,680 | Sands et al. | Sept. 9, 1941 |
| 2,267,047 | Schaper | Dec. 23, 1941 |
| 2,285,979 | Jacob | June 9, 1942 |
| 2,334,670 | De Cola | Nov. 16, 1943 |
| 2,383,286 | Beers | Aug. 21, 1945 |
| 2,439,277 | Walker | Apr. 6, 1948 |
| 2,441,116 | Mackey | May 4, 1948 |

FOREIGN PATENTS

| Number | Country | Date |
|---|---|---|
| 362,530 | Great Britain | Dec. 10, 1931 |
| 219,530 | Switzerland | Feb. 15, 1942 |